United States Patent [19]

Fukuda

[11] Patent Number: 5,896,394
[45] Date of Patent: Apr. 20, 1999

[54] DATA STRUCTURE, DATA COMMUNICATION METHOD, APPARATUS AND COMMUNICATION TERMINAL APPARATUS

[75] Inventor: Kunio Fukuda, Tokyo, Japan

[73] Assignee: Sony Corporation, Tokyo, Japan

[21] Appl. No.: 08/789,476

[22] Filed: Jan. 27, 1997

[30] Foreign Application Priority Data

Feb. 5, 1996 [JP] Japan .................................. 8-018960
Feb. 7, 1996 [JP] Japan .................................. 8-021379

[51] Int. Cl.⁶ .................................................. G01R 31/28
[52] U.S. Cl. ............................ 371/20.1; 371/32; 371/35
[58] Field of Search .............................. 371/20.5, 30, 31, 371/32, 34, 67.1, 68.2, 20.1, 20.2, 20.4, 33, 37.01, 68.1; 364/265.1, 265, 944.5; 395/183.19, 183.05, 185.09

[56] References Cited

U.S. PATENT DOCUMENTS

| | | | |
|---|---|---|---|
| 4,549,297 | 10/1985 | Nishimoto | 371/33 |
| 5,414,717 | 5/1995 | Matsumoto et al. | 371/32 |
| 5,715,257 | 2/1998 | Matsuki et al. | 371/32 |

*Primary Examiner*—Trinh L. Tu
*Attorney, Agent, or Firm*—Jay H. Maioli

[57] ABSTRACT

A data communication method in which the data frame transmitted from the transmission side to the reception side and the feedback frame transmitted from the reception side to the transmission side use a common format jointly, and in which if there is no substantial data to be transported by the feedback frame on the reception side, the feedback frame is transmitted from the reception side to the transmission side without changing the format of the feedback frame and lowering the reception rate. The common format includes at least the transmission data length, the transmission data, the data frame number and the repeat request frame number, and is added with the error detection code for all the data. If there is no substantial transmission data to be transported by the feedback frame on the reception side, then the feedback frame is arranged such that data unrelated to feedback information including at least the transmission data length, the transmission data and the data frame number within the feedback frame, is substituted with a predetermined fixed pattern, and thereafter an error detecting code for all the data is added thereto. Then, the feedback frame is transmitted from the reception side to the transmission side.

26 Claims, 10 Drawing Sheets

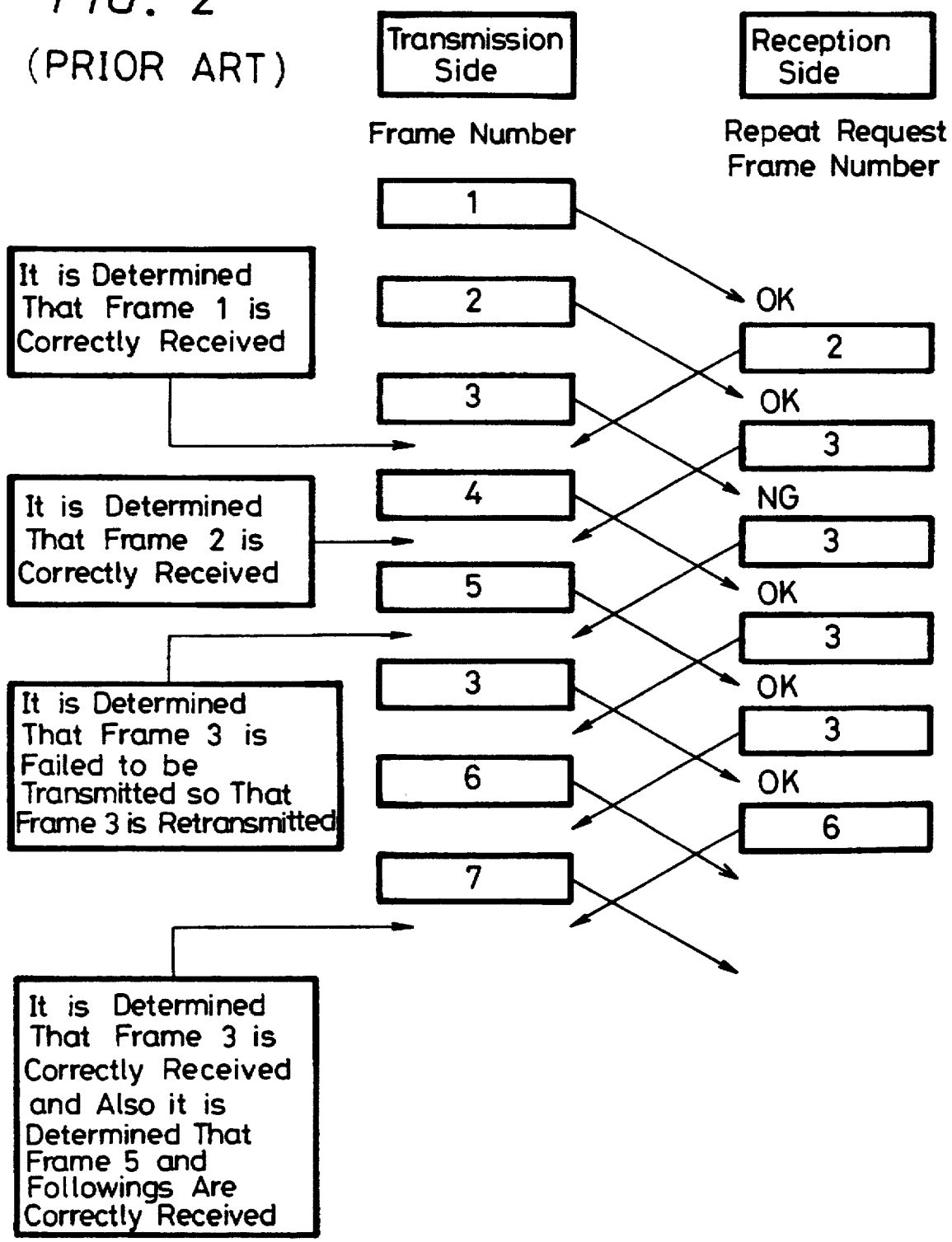

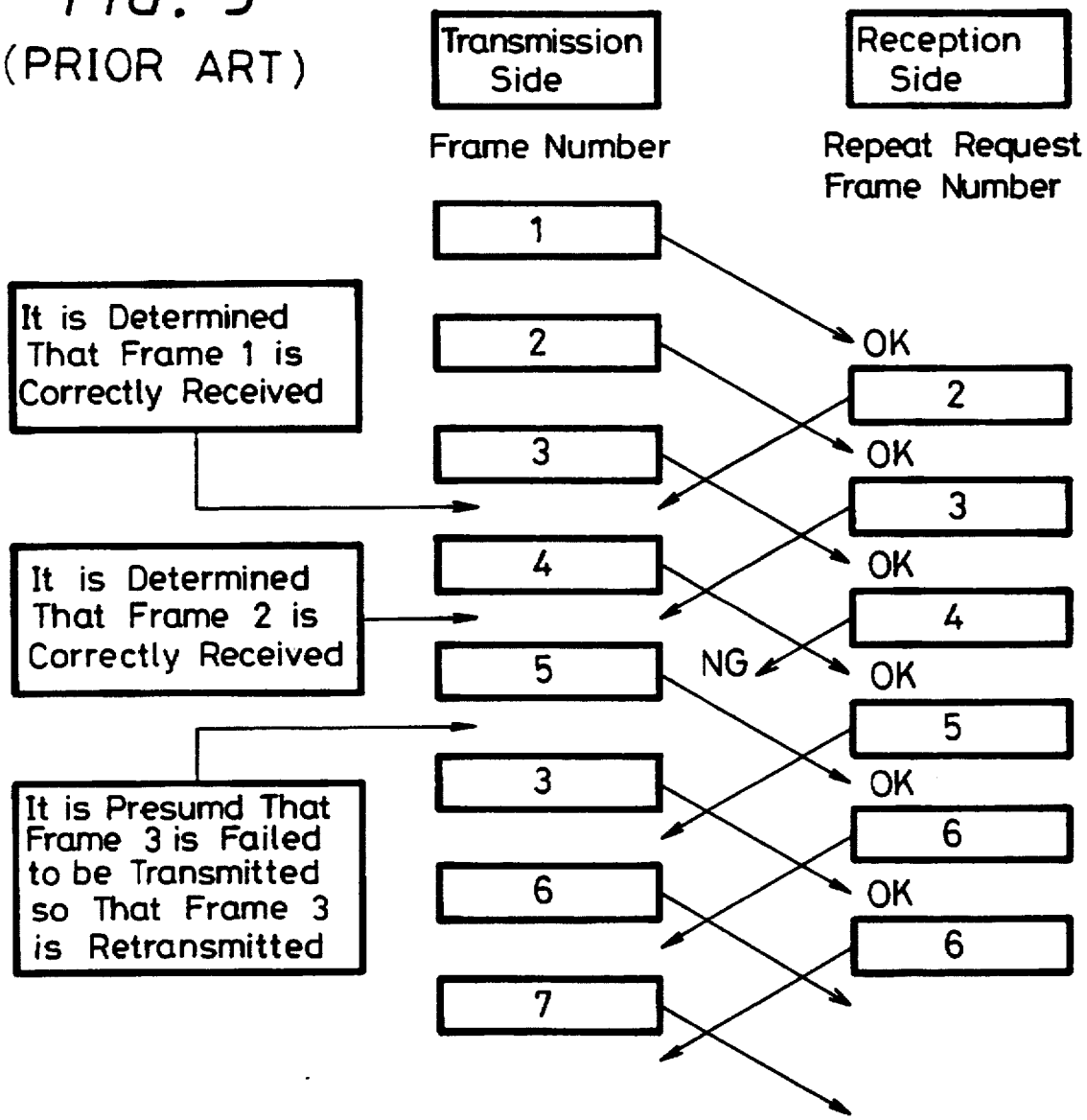

DATA STRUCTURE, DATA COMMUNICATION METHOD, APPARATUS AND COMMUNICATION TERMINAL APPARATUS

BACKGROUND

1. Field of the Invention

The present invention relates to a data communication method (wireless digital communication method) in which error control is carried out based on an automatic repeat request system.

2. Background of the Invention

As an error control method in data communication, there has been proposed an error control method in an automatic repeat request (ARQ: Automatic Repeat Request or Automatic Request for Repetition) system. According to the error control method based on the automatic repeat request system, if a data frame transmitted from a transmission side to a reception side contains an error, the data frame is again transmitted from the transmission side to the reception side on the basis of the repeat request issued from the reception side to the transmission side.

Various methods have been proposed as the error control method of the automatic repeat request system. Now, a prior art example of an automatic repeat request error control method of a selective repeat (hereinafter referred to as SR) system will hereinafter be described. The selective repeat request system theoretically requires a buffer memory having an unlimited capacity. Thus, such a system is not employed normally, but its improved type is utilized. An automatic repeat request error control method of a primitive SR system will hereinafter be described for making the explanation easy.

Initially, an example of an arrangement of an ARQ frame in which a data frame and a feedback frame have an identical format will be described with reference to FIG. 1. The ARQ frame includes a transmission data frame length A of 16 bits, for example, transmission data B of 584 bits, for example, a transmission data frame number C of 8 bits, for example, and a repeat request frame number D of 8 bits, for example, and the frame is further added with an error detecting code E of 16 bits, for example. This error detecting code E serves for detecting an error which can be contained anywhere in the data.

The transmission data length A can take a value of the data amount of the transmission data B, e.g., values from 0 to 584 in a bit unit. In this case, the data amount thereof is 584 bits. The transmission frame number C indicates a frame number of a frame to be transmitted, and hence the number can be a number from 1 to 255. The repeat request frame number D is utilized in a feedback frame to be transmitted from the reception side to the transmission side, and it indicates a frame number of a frame that is expected to be received next on the reception side, i.e., the earliest frame number that has not been received yet.

The error detecting code E is arranged as a CRC (Cyclic Redundancy check) based on an advice of an ITU (International Telecommunication(s) Union)—T (16 bits). The CRC is effective for detecting an error contained in a region of 624 bits, i.e., the region from the transmission data length A to the repeat request frame number D.

Now, a manner for transmitting an ARQ frame based on the SR system when the transmission frame can be transmitted with failure will be described with reference to FIG. 2 below. As shown in FIG. 2, rectangular frames, each having a numeral written therein, arrayed on the transmission side depict transmission frames, and each numeral written therein designates a frame number. Rectangular frames arrayed on the reception side depict repeat request frames, and each numeral written in each of them also designates a frame number. Although a data frame is originally transmitted from the transmission side to the reception side, there is no data frame originally transmitted from the reception side to the transmission side.

Operations carried out on the transmission side are as follow:

(1) A transmitter on the transmission side transmits transmission frames 1, 2, 3 continuously.

(2) A feedback frame of a repeat request frame number, 2 is received from the reception side. Thus, it is determined that the transmission frame 1 is correctly received on the reception side. A transmission frame 4 is transmitted next.

(3) A feedback frame of a repeat request frame number, 3 is received. Thus, it is determined that the transmission frame 2 is correctly received on the reception side. A transmission frame 5 is transmitted next.

(4) A feedback frame of the repeat request frame number, 3 again is received. Thus, it is determined that the transmission frame 3 does not correctly reach the reception side. Therefore, the transmission frame 3 is again transmitted.

(5) A feedback frame of the repeat request frame number, 3 is again received. Thus, it is also determined that the transmission frame 3 does not correctly reach the reception side. However, since the transmission frame 3 has been already retransmitted, a transmission frame 6 is transmitted next.

(6) A feedback frame of the repeat request frame number, 3 is again received. Thus, it is determined that the transmission frame 3 does not correctly reach the reception side. However, since the transmission frame 3 has been already retransmitted, a transmission frame 7 is transmitted next.

(7) A feedback frame of a repeat request frame number, 6 is received. Thus, it is determined that the transmission frames 3, 4, 5 correctly reached the reception side.

Operations carried out on the reception side are as follow:

(1) When a receiver on the reception side receives the transmission frame 1 correctly, the feedback frame of the repeat request frame number, 2 is transmitted as a repeat request frame.

When the receiver receives the transmission frame 2 correctly, the feedback frame of the repeat request frame number, 3 is transmitted as a repeat request frame.

(2) The transmission frame 3 is received incorrectly. The repeat request frame number, 3 is transmitted with the feedback frame.

(3) The transmission frames 4, 5 are correctly received. Since the transmission frame 3 has not been received, the feedback frame of the repeat request frame number, 3 is transmitted.

(4) The transmission frame 3, which is again transmitted as the retransmitted frame, is correctly received. Since the transmission frame 5 has been correctly received so far, a feedback frame with the repeat request frame number, 6 is transmitted as a frame that is expected to be received next on the reception side.

As described above, according to the error control method of the automatic repeat request system based on the SR system, the transmitter on the transmission side is transmits data frames continuously until it receives the feedback frame indicating that a frame reached the reception side incorrectly. If the transmitter receives information indicative that the frame has reached incorrectly, then it transmits the data frame again. In this manner, the communication system is controlled to recover erroneous data transmission from the transmission side to the reception side.

While in the above case described with reference to FIG. 2, it is assumed that the feedback frame can be transmitted from the reception side to the transmission side without failure, the feedback frame naturally can be transmitted with failure in the actual transmission path, i.e., a space through which electric wave propagates. Now, a manner of the ARQ transmission based on the SR system when the feedback frame is incorrectly transmitted will be described with reference to FIG. 3.

Operations carried out on the transmission side are as follow:

(1) The transmission frames 1, 2, 3 are transmitted continuously.

(2) The feedback frame of a repeat request frame number, 2 is received from the reception side. Thus, it is determined that the transmission frame 1 correctly reached the reception side, and the transmission frame 4 is transmitted.

(3) The feedback frame of the repeat request frame number, 3 is received. Thus, it is determined that the transmission frame 2 correctly reached the reception side, and the transmission frame 5 is transmitted.

(4) A feedback frame of the repeat request number, 4 is not received. Thus, it is presumed that the transmission frame 3 did not correctly reach the reception side, and hence the transmission frame 3 is again transmitted.

(5) A feedback frame of the repeat request frame number, 5 is received. Thus, it is determined that the transmission frames 3, 4 have correctly reached the reception side. Therefore, the transmission frame 6 is transmitted.

(6) A feedback frame of the repeat request frame number, 6 is received. Thus, it is determined that the transmission frame 5 has correctly reached the reception side, and the transmission frame 7 is transmitted next.

Operations carried out on the reception side are as follow:

(1) The transmission frames 1, 2, 3, 4 and 5 are correctly received. The feedback frames of repeat request frame numbers, 2, 3, 4, 5 and 6 are respectively transmitted.

(2) The transmission frame 3 is again correctly received. Since the transmission frame 3 has been already received, the received transmission frame 3 received in an overlapping fashion is discarded. The feedback frame of the repeat request frame number, 6 is transmitted.

As described above, according to the SR system of the prior art example, when the feedback frame fails to be transmitted, leading to the presumption that the corresponding transmission frame is incorrectly received on the reception side, the data frame is transmitted in an overlapping fashion from the transmission side to the reception side in spite of the fact that the data frame has been correctly transmitted from the transmission side to the reception side.

In this case, the ARQ frame is arranged as a full duplex communication system as described above. Therefore, the system is requested to permit data transmission not only from the transmission side to the reception side but also from the reception side to the transmission side at any time. Accordingly, the data frame transmitted from the transmission side to the reception side and the feedback frame transmitted from the reception side to the transmission side have a common format. Therefore, even if there is no transmission data to be transmitted from the reception side with the feedback frame, upon transmission from the reception side to the transmission side, extra information (redundant portion of data) such as "transmission data length", "transmission data", "transmission frame number" and so on have to be included in the feedback frame for maintaining the frame arrangement described with reference to FIG. 1. This leads to a drawback that the reception rate at the transmission side is lowered, resulting in lowering of throughput.

In general, a communication protocol is designed to permit the full duplex communication to be executable. However, in actual practice, communication is often accomplished in a half duplex fashion, i.e., data delivery confirmation is effected in a step-by-step fashion, and hence it is not always necessary to transport data by the feedback frame from the reception side at any time. Therefore, it is undesirable to lower the throughput in spite of the fact that the feedback frame is not always requested to transport transmission data.

Further, in a data communication method in which the data frame transmitted from the transmission side to the reception side and the feedback frame transmitted from the reception side to the transmission side have an identical format, when transmission data to be transported by the data frame or the feedback frame is much shorter ($LB_x$ is taken as its data length) than a predetermined data length ($LB_0$ is taken as the length which derives from the format), reception rate is lowered upon transmission with the predetermined data length $LB_0$ maintained as it is.

SUMMARY OF THE INVENTION

Therefore, it is a general object of the present invention to provide an improved communication method and communication apparatus in which the aforesaid shortcomings and disadvantages encountered with the prior art can be eliminated.

More specifically, it is an object of the present invention to propose a communication method utilized for communication in which the data frame transmitted from the transmission side to the reception side and the feedback frame transmitted from the reception side to the transmission side have an identical format, wherein even if there is no substantial transmission data to be transported by the feedback frame from the reception side, the feedback frame can be transmitted from the reception side to the transmission side without changing the format of the feedback frame and lowering the reception rate.

It is another object of the present invention to propose a communication method utilized for communication in which the data frame transmitted from the transmission side to the reception side and the feedback frame transmitted from the reception side to the transmission side have an identical format, wherein if the data length of the transmission data to be transported by the feedback frame on the reception side or the transmission data to be transported by the data frame on the transmission side, is shorter than the predetermined data length, then the feedback frame or the data frame is arranged to be transmitted from the reception side to the transmission side or from the transmission side to the reception side without changing the format of the feedback frame or the data frame and lowering the reception rate.

According to one aspect of the present invention, there is provided a data structure utilized for communication in which a data frame transmitted from a transmitter and a feedback frame fedback from a receiver have an identical format, wherein a redundant portion of the feedback frame is substituted with a predetermined bit stream.

According to a second aspect of the present invention, there is provided a communication method utilized for communication in which a data frame transmitted from a transmitter and a feedback frame fedback from a receiver have an identical format, comprising a step of substituting a redundant portion of the feedback frame with a predetermined bit stream upon forming the feedback frame containing substantial information.

According to a third aspect of the present invention, there is provided a communication method utilized for communication in which a data frame transmitted from a transmitter and a feedback frame fedback from a receiver have an identical format and also utilized by the transmitter which receives the feedback frame from the receiver, comprising steps of determining whether or not a redundant portion of the feedback frame transmitted from the receiver consists of a first predetermined bit stream, and substituting another redundant portion of the feedback frame other than that redundant portion with a second predetermined bit stream if it is determined that that redundant portion of the feedback frame consists of the first predetermined bit stream.

According to a fourth aspect of the present invention, there is provided a communication apparatus utilized for communication in which a data frame transmitted from a transmitter and a feedback frame fedback from a receiver have an identical format, comprising a feedback frame input terminal means for being supplied with the feedback frame, a determining means for determining whether or not a redundant portion of the feedback frame consists of a first predetermined bit stream, a second predetermined bit stream generating means for generating a second predetermined bit stream, substituting means for substituting another redundant portion of the feedback frame other than that redundant portion with a second predetermined bit stream if it is determined that that redundant portion of the feedback frame consists of the first predetermined bit stream, and an error detecting means for detecting an error in an output signal supplied from said substituting means.

According to a fifth aspect of the present invention, there is provided a communication apparatus utilized for communication in which a data frame transmitted from a transmitter and a feedback frame fedback from a receiver have an identical format, comprising an antenna for transmitting and receiving a radio wave, a received signal processing means for processing a received signal, a transmitting signal processing means for processing a transmitting signal, and a baseband signal processing means for processing a baseband signal, wherein said baseband signal processing means is arranged to have a feedback frame input terminal means for being supplied with the feedback frame, a determining means for determining whether or not a redundant portion of the feedback frame consists of a first predetermined bit stream, a second predetermined bit stream generating means for generating a second predetermined bit stream, a substituting means for substituting another redundant portion of the feedback frame other than that redundant portion with a second predetermined bit stream if it is determined that that redundant portion of the feedback frame consists of the first predetermined bit stream, and an error detecting means for detecting an error in a signal supplied from the substituting means.

The above and other objects, features, and advantages of the present invention will become apparent from the following detailed description of an illustrative embodiment thereof to be read in conjunction with the accompanying drawings, in which like reference numerals are used to identify the same or similar parts in the several views.

BRIEF DESCRIPTION OF THE DRAWINGS

FIG. 2 is a diagram showing a manner of transmitting ARQ frames based on an SR system when a transmission frame is erroneously transmitted;

FIG. 3 is a diagram showing a manner of transmitting ARQ frames based on an SR system when the feedback frame is erroneously transmitted;

DETAILED DESCRIPTION OF THE PREFERRED EMBODIMENTS

Figure 1:
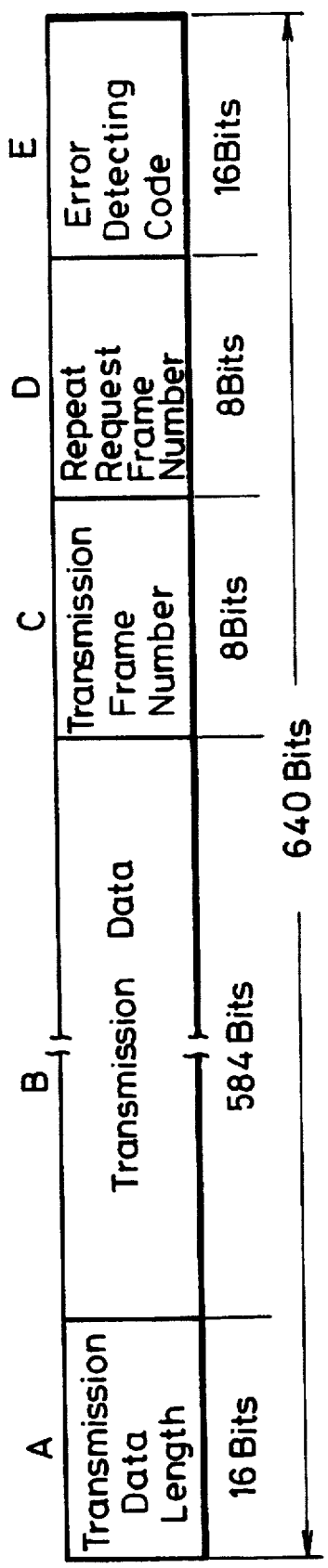
FIG. 1 is a schematic diagram showing an example of an arrangement of an ARQ frame.

An embodiment of the present invention will hereinafter be described with reference to the accompanied drawings. An ARQ data frame transmitted from the transmission side to the reception side and an ARQ feedback frame transmitted from the reception side to the transmission side have an identical format. As has been described with reference to FIG. 1, the format includes a transmission data frame length A of 16 bits, for example, transmission data B of 584 bits, for example, a transmission data frame number C of 8 bits, for example, and a repeat request frame number D of 8 bits, for example, and the format is further added with an error detecting code E of 16 bits, for example, serving all the data.

The transmission data length A can take a value of the data amount of the transmission data B, e.g., values from 0 to 584 in a bit unit. In this case, the data amount thereof is 584 bits. The transmission frame number C indicates a frame number of a frame to be transmitted (e.g., from 0 or 1 to 255). The repeat request frame number D is used in a feedback frame transmitted from the reception side to the transmission side, and it indicates a frame number of a frame that is expected to be received on the reception side (the oldest frame number that has not been received yet).

The error detecting code E is arranged as a CRC (Cyclic Redundancy Check) code based on the ITU (International Telecommunication(s) Union)—T (16 bits) as described above. A region in which the CRC is applied is a region of 624 bits from the transmission data length A to the repeat request frame number D.

Figure 4:
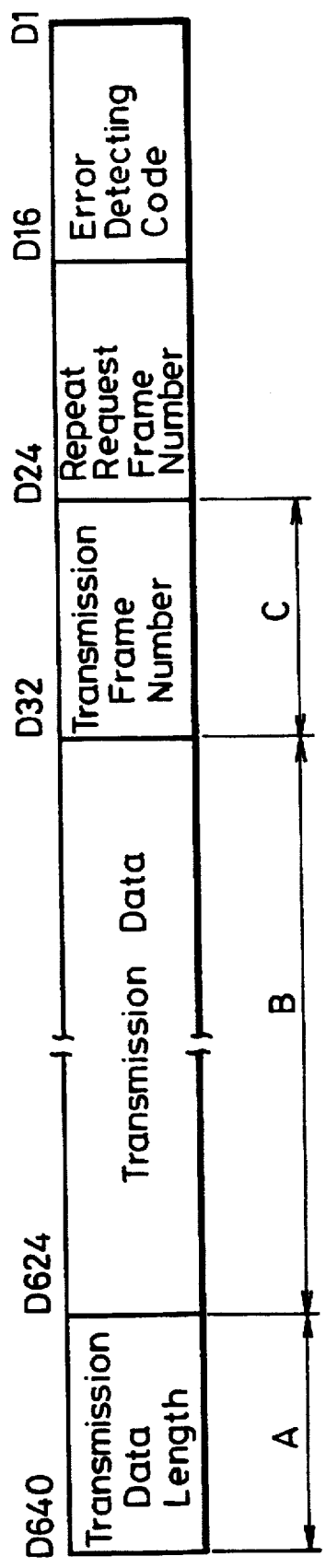
FIG. 4 is a schematic diagram showing an example of an arrangement of a feedback frame according to the present invention.
Figure 5:
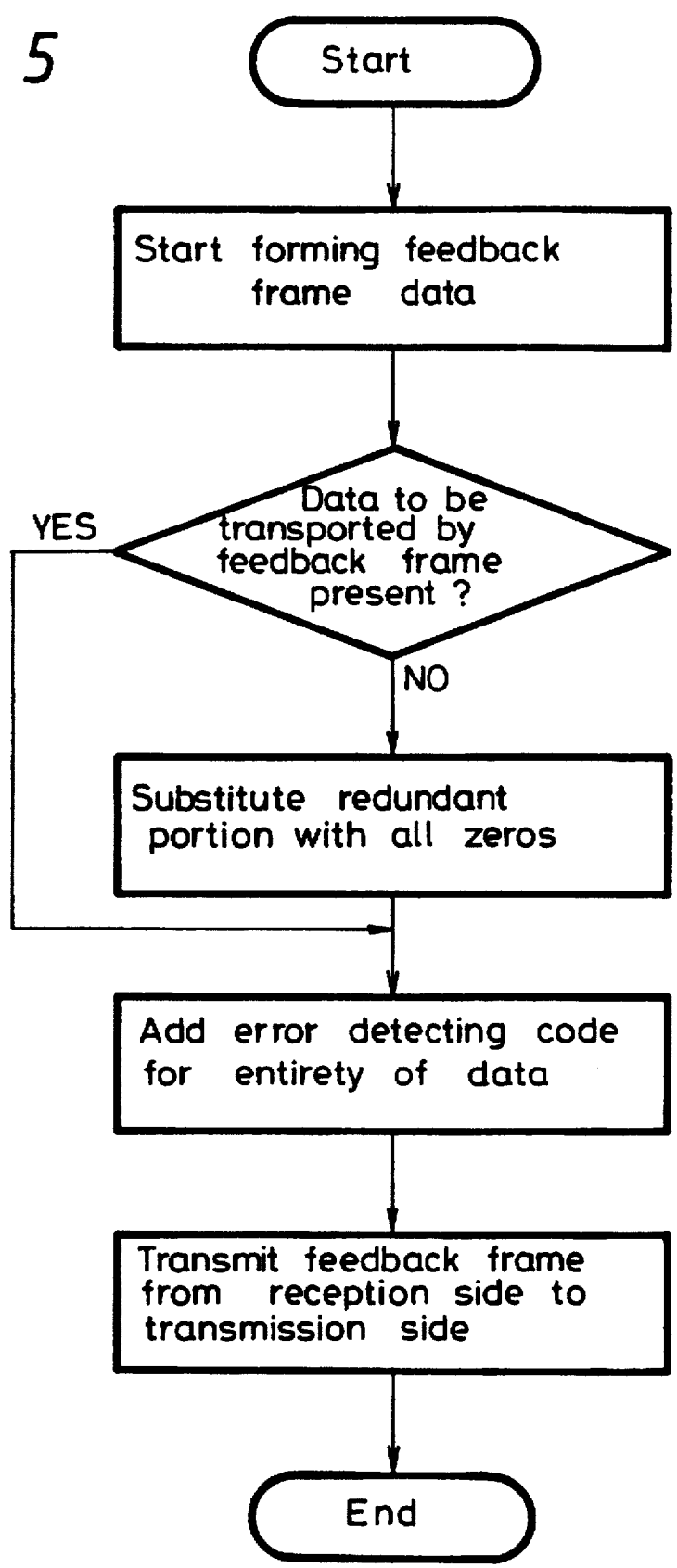
FIG. 5 is a flowchart showing a process for forming a feedback frame.

Next, the format of the feedback frame to be transmitted from the reception side to the transmission side will be described with reference to FIG. 4. The format of the feedback frame differs in the values of the transmission data length A, transmission data B and transmission frame number C, depending on whether or not there is transmission data to be transmitted with the feedback frame. FIG. 5 is a flowchart showing a process for forming a feedback frame. If there is transmission data to be transmitted with the feedback frame on the reception side, the feedback frame thereof takes the values described with reference to FIG. 1, and is directly transmitted from the reception side to the transmission side.

If there is no transmission data to be transmitted with the feedback frame on the reception side, the data of the transmission data length A of 16 bits, the transmission data B of 584 bits and the transmission frame number C of 8 bits are data unrelated to feedback information (a redundant portion of data). Therefore, they are substituted with all zeros. The repeat request frame number D is kept as it is. Thus, the feedback frame is composed of the data of the transmission data length A of 16 bits, the transmission data B of 584 bits and the transmission frame number C of 8 bits, which are substituted with all zeros, the repeat request frame number D, and the error detecting code E of 16 bits serving all the data of 624 bits. The feedback frame is transmitted from the reception side to the transmission side.

Figure 6:
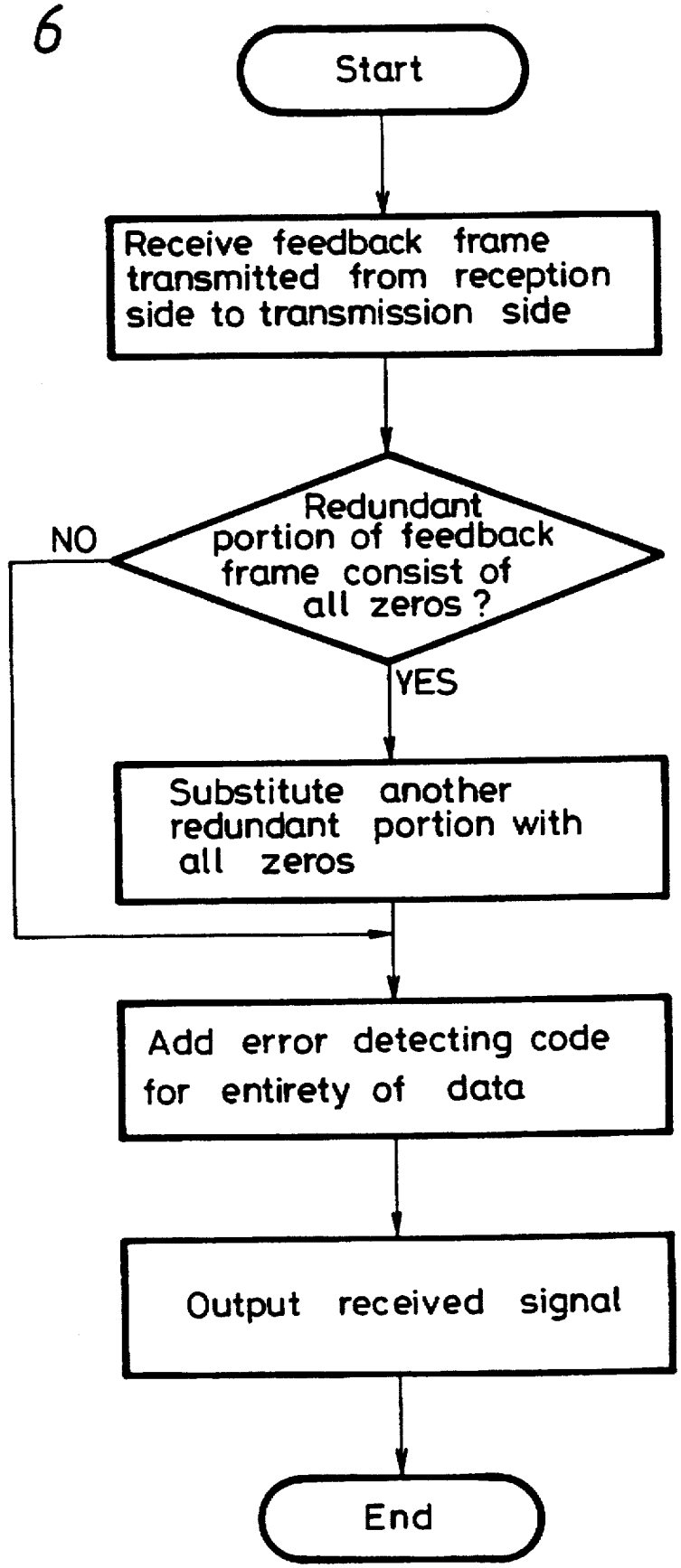
FIG. 6 is a flowchart showing a process for receiving and processing the feedback frame.
Figure 7:
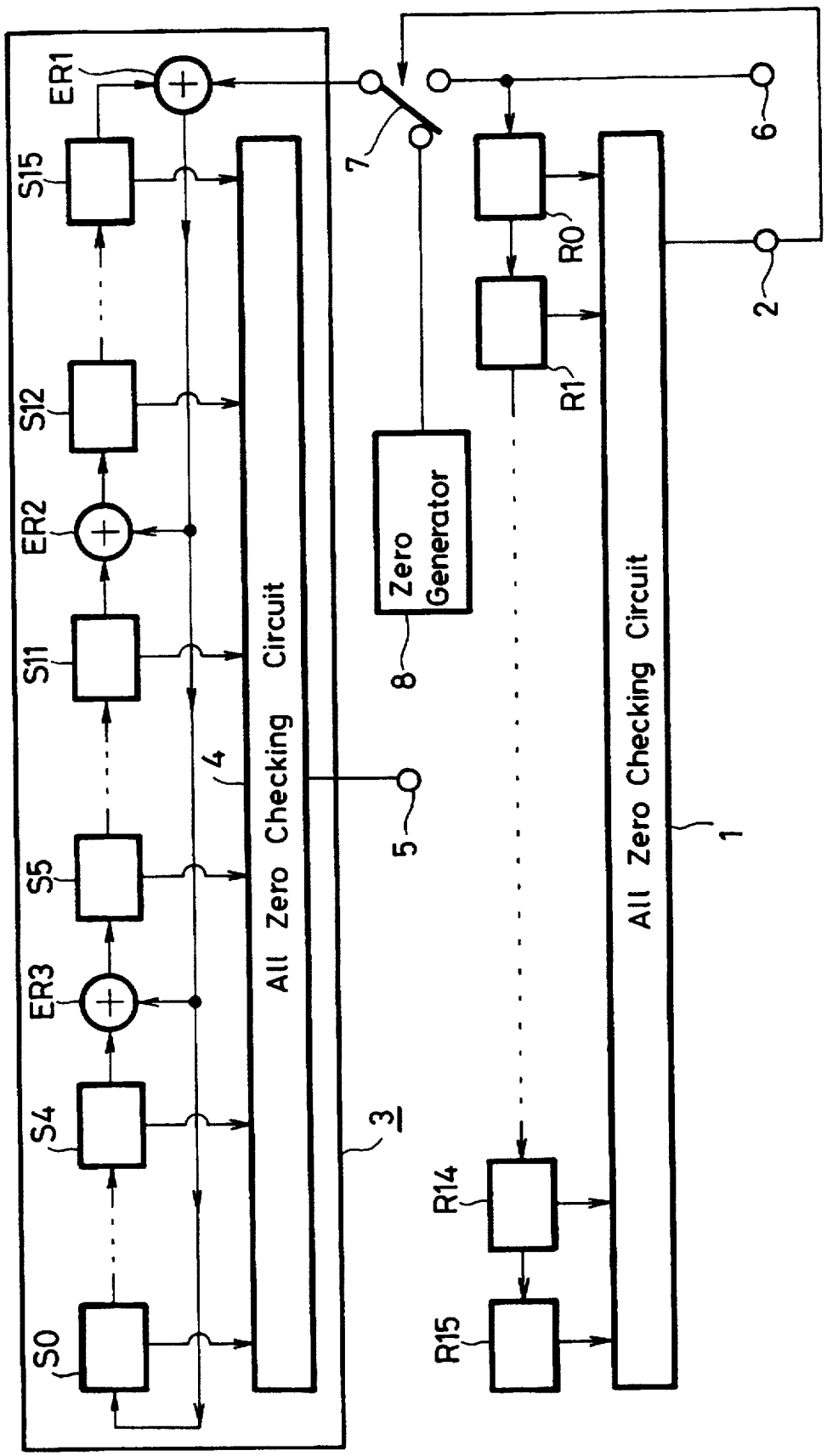
FIG. 7 is a schematic block diagram showing an example of an error detecting apparatus for detecting an error in the feedback frame according to the present invention.

FIG. 6 is a flowchart showing a process for receiving and processing the feedback frame. An error detecting apparatus, which is illustrated in FIG. 7, is operated in accordance with the process of the flowchart in FIG. 6, thereby detecting an error in the feedback frame received on the transmission side. Now, the operation of the error detecting apparatus will be described with reference to FIG. 7. In FIG. 7, reference numeral represents an all zero checking circuit, 3 an error detecting circuit, 8 a zero generator, 7 a changeover switch for carrying out switching action across an input terminal 6 and the zero generator 8 so that the error detecting circuit 3 is supplied with a data row from the input terminal and a data row of all zeros from the zero generator. The changeover switch 7 is controlled by a control signal supplied from the all zero checking circuit 1 to a control terminal 2.

Data rows (bit strings) from D640 (MSB) to D1 (LSB) constituting the feedback frame are supplied to the input terminal 6 sequentially, and the data rows are supplied to an FF circuit R0 at a first stage of a shift register which is composed of sixteen D-type flip-flop circuits (hereinafter simply referred to as FF circuits) R0, R1, . . . , R14, R15 connected in a cascade fashion. In this figure, the data row is shifted in the left-hand direction. When data D640 to D625 of 16 bits of the transmission data length A is stored in the FF circuits R15 to R0, then it is determined whether the data D640 to D625 is all zeros or at least one circuit is stored with a one, by using the all zero checking circuit 1 which is composed of an OR gate or the like. If the data is all zeros, then it is determined that the feedback frame contains no data while if the data is not all zeros, then it is determined that the feedback frame contains data.

When it is determined that the data D625 to D640 of the data length A is all zeros by the all zero checking circuit 1, then the changeover switch 7 connects the error detecting circuit to the input terminal 6 side in a period of the data row D640 to D625 of the transmission data length A, a period of the data row D624 to D17 of the repeat request frame number D, and a period of the data row D16 to D1 of the error detecting code E, out of the data rows D640 to D1 of the feedback frame supplied from the input terminal 6, whereby the data rows are supplied through the changeover switch 7 to the error detecting circuit 3 unconditionally. On the other hand, during a period of data row D624 to D33 of the transmission data B and a period of data row D32 to D25 of the transmission frame number C, the changeover switch 7 connects the error detecting circuit to the zero generator 8 side, whereby data from the zero generator 8 is supplied to the error detecting circuit 3.

Specifically, if the determination result of the all zero checking circuit 1 is that the data is all zeros, that is, the transmission data B contains no data, the data row D624 to D33 of the transmission data B and data row D32 to D25 of the transmission frame number C are again substituted with data of all zero.

Since the error detecting code is of "ITU-T 16 bits CRC", the generative polynomial of the error detecting circuit 3 is expressed as $X^{16}+X^{12}+X^5+1$. Therefore, 16 FF circuits S0, S1, . . . , S15 are connected in a cascade fashion, and exclusive-OR circuits ER1, ER2 and ER3 are inserted and added at the output side of the FF circuit S15, between the FF circuits S11 and S12, and between the FF circuits 4 and 5, respectively. Then, an output of the FF circuit S15 and an output of the changeover switch 7 are supplied to the exclusive-OR circuit ER1 in which an exclusive-OR operation is carried out. An output thereof is fedback to the exclusive-OR circuits ER2, ER3 and the FF circuit S0. The exclusive-OR circuit ER3 carries out an exclusive-OR operation on an output of the FF circuit S4 and an output of the exclusive-OR circuit ER 1, and an output thereof is supplied to the FF circuit S5. Further, the exclusive-OR circuit ER2 carries out exclusive-OR operation on an output of the FF circuit S11 and an output of the exclusive-OR circuit ER 1, and an output thereof is supplied to the FF circuit S12. Outputs of the respective FF circuits S0, S1, . . . , S15 are supplied to the all zero detecting circuit 4 composed of an OR gate or the like and an output indicative of the determination is obtained at an output terminal 5. By the way, data of the FF circuits S0 to S15 is shifted in the right-hand direction in the figure.

Initially, a one is inputted to the FF circuits S0 to S15 as an initial value, and thereafter data row D640 to D1 of a feedback frame from the input terminal 6 are sequentially supplied through the exclusive-OR circuit ER1 to the FF circuit S0 at the first stage. At the time point after the last data D1 is inputted to the FF circuit S0 and then outputted from the FF circuit S15, the result of the error detection is stored in the FF circuits S0 to S16. If outputs of the respective FF circuits S0, S1, . . . , S15 are all zeros, then it is determined that the data contains no error while if the outputs are not all zeros, then it is determined that the data contains an error.

The error control method in the automatic repeat request system in the selective repeat system employed by the prior art described with reference to FIG. 2 and FIG. 3 is also applied to the mode of the implementation. On the reception side, the repeat request frame number of the feedback frame is a frame number of a frame that has not been received yet and is expected to be transmitted next from the transmission side to the reception side. If the determination output from the error detecting apparatus indicates that there is no error, then the frame number, of which frame is desired to be transmitted next from the transmission side to the reception side, is consecutively increased. But if the determination output from the error detecting apparatus indicates that there is an error, then the repeat request number is repeated at the same frame number.

Figure 8A:
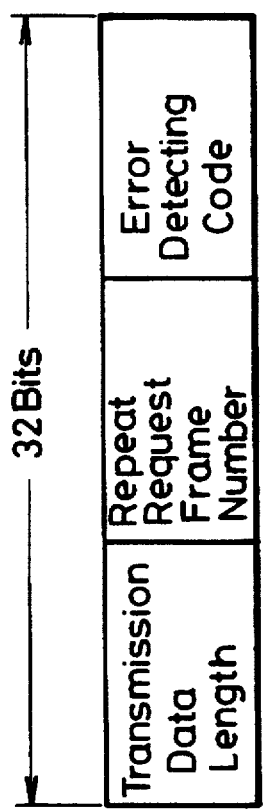
FIGS. 8A and 8B are diagrams useful for comparison between the present invention and the prior art example regarding length of an effective portion of the feedback frame.
Figure 8B:
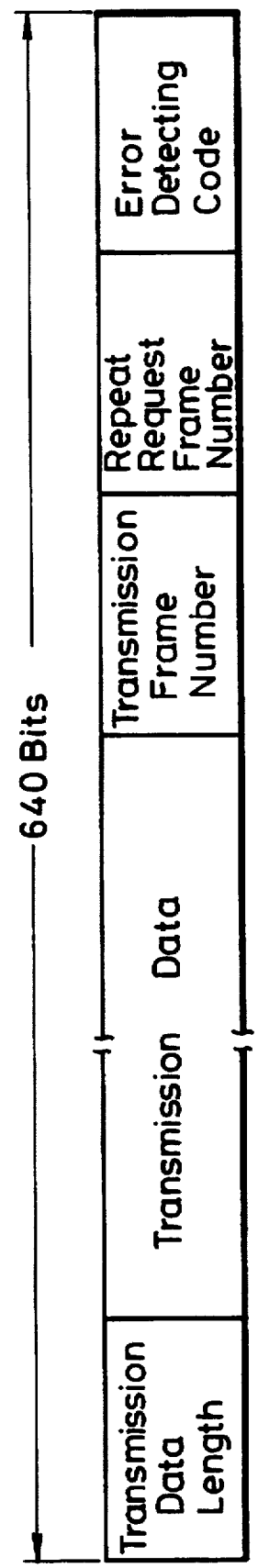

As shown in FIG. 8A, the effective feedback frame in the mode of the above implementation includes the transmission data length C, the repeat frame request number D and the error detecting number E of 32 bits. Thus, the number of bits is remarkably reduced as compared with the total bits number of the feedback frame of the prior art example shown in FIG. 8B, i.e., 640 bits, and hence the reception rate of the feedback frame is remarkably improved. Therefore, reduction in the total throughput of an ARQ due to an error of the feedback frame can be relieved.

Figures 9, 11:
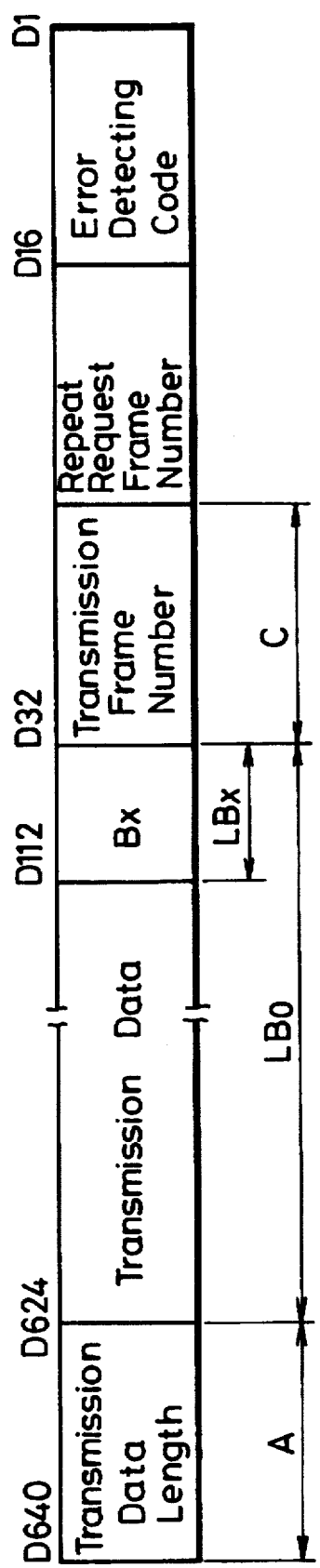
FIG. 9 is a table useful for comparison between the present invention and the prior art example regarding a reception rate of a feedback frame when the feedback frame transports no substantial transmission data.
FIG. 11 is a schematic diagram showing an example of an arrangement of a feedback frame according to the present invention, wherein the feedback frame contains substantial transmission data.

FIG. 9 shows a comparison between the above-described embodiment and the prior art example regarding reception rates when there is no transmission data contained in the feedback frame. In this table chart of FIG. 9, it is assumed that the reception rate does not involve a reception rate in a frame synchronizing fashion and the error is a random error.

Incidentally, if p is taken as a bit error rate, the reception rate R of a frame having a data length of j bits when a random error is caused is expressed by the following equation, where a bit reception rate in a frame synchronizing fashion is not involved.

$$R=(1-p)^j$$

In the table chart of FIG. 9, the reception rate R is calculated under the condition that the bit error rate p is set to $10^{-5}$, $10^{-4}$, $10^{-3}$, $10^{-2}$, respectively, in the above equation, and the data length is set to j=32 in the embodiment and j=640 in the prior art example, and they are expressed on the percentage base.

Now, the embodiment and the prior art example are compared with each other for the reception rate R when random error is caused in a frame under the condition that the bit error rate is $10^{-3}$, which is frequently utilized as a mean error rate in the physical circuit of a mobile communication. While the reception rate is 52.7% in the prior art example, the reception rate is remarkably improved to 96.8% in the embodiment. Further, the embodiment and the prior art example are compared with each other for the reception rate R when random error is caused in a frame under condition that the bit error rate is $10^{-2}$, which is a worse environment. While the reception rate is 1.6% in the prior art example, the reception rate is remarkably improved to 72.5% in the embodiment.

Figure 10:
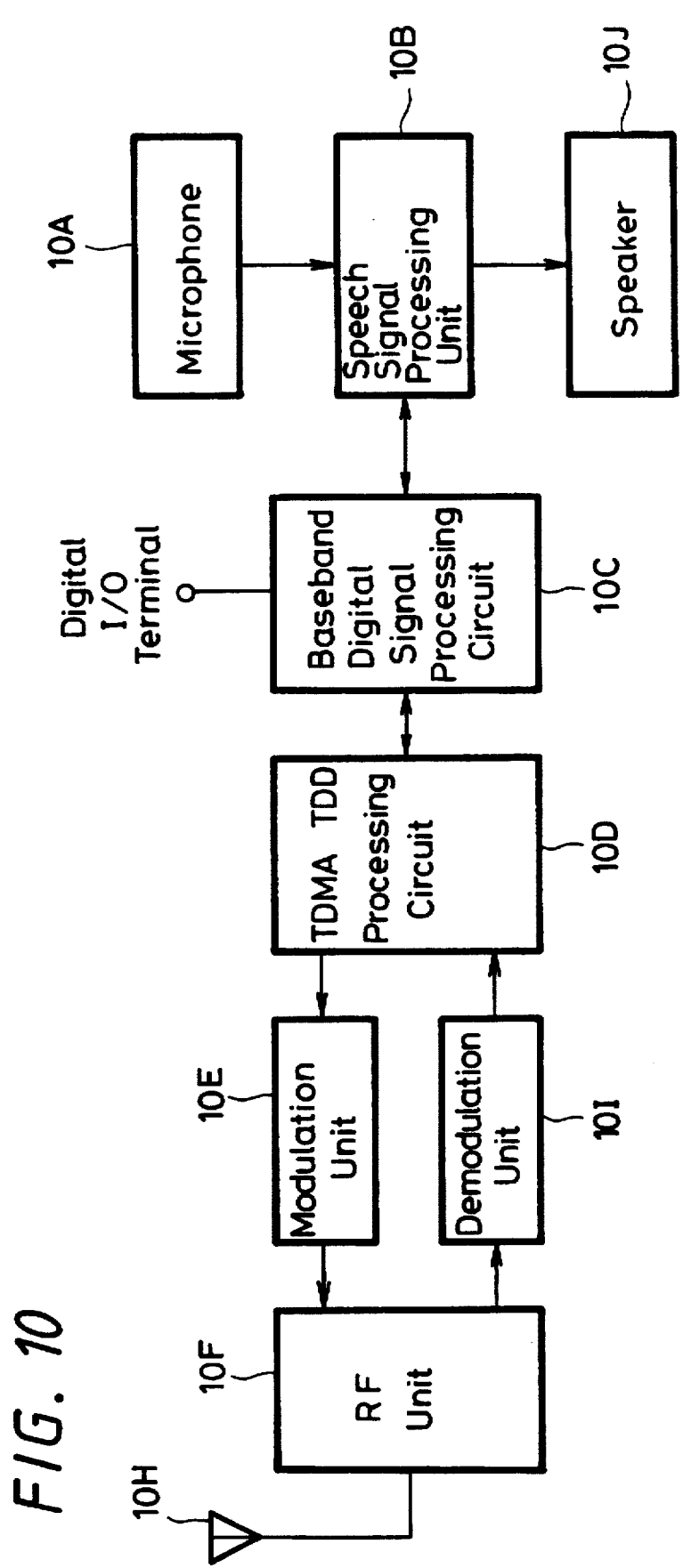
FIG. 10 is a schematic block diagram showing an arrangement of a communication terminal apparatus to which the present invention is applied.

FIG. 10 is a schematic block diagram showing an arrangement of a communication terminal apparatus such as a portable telephone or the like to which the present invention is applied. As shown in FIG. 10, speech of a user is picked up by a microphone 10A. The picked-up speech is supplied to a speech signal processing unit 10B in which it is converted into a speech signal. The speech signal is supplied through a baseband digital signal processing circuit 10C, a TDMA/TDD processing circuit 10D, a modulation unit 10E, and an RF unit 10F sequentially to an antenna 10H. Then, a transmission frame converted from the speech signal is transmitted from the antenna 10H. Conversely, when the communication apparatus receives a signal of a feedback frame by means of the antenna 10H, the received signal of the feedback frame is supplied through the RF unit 10F, a demodulation unit 10I, the TDMA/TDD processing circuit 10D, and the baseband digital signal processing circuit 10C to the speech signal processing unit 10B in which it is converted into a speech signal to be supplied to a speaker 10J. Then, the speaker 10J emanates corresponding speech. The above-described invention is implemented in the baseband digital signal processing circuit of the communication terminal apparatus.

In the case of a compromise type portable telephone system (PHS: personal handy-phone system), i.e., when a frequency is 1.9 GHz, a transfer rate is set to 32 kbps, and a mobile speed of the portable telephone is assumed to be 5 km/h (normal walking speed of a man), if an error is caused at 10 dB or below from a value at the median of the phasing, its error interval becomes 12 ms (384 bits), which falls within a correction capability (592 bits) of the feedback frame. Therefore, the system is tolerable against all errors between a total of 592 bits of the transmission data and the transmission frame number even if a burst error is caused. Thus, it is possible to satisfactorily cope with a burst error.

While in the above-described embodiments, the data which is unrelated to the feedback information in the feedback frame to be transmitted from the reception side to the transmission side and the feedback frame received on the transmission side is substituted with all zeros as a predetermined fixed pattern, this data may be substituted with all ones. In either of the cases, the substitution can be made with ease and an arrangement of a fixed pattern generator becomes simple. In addition, various bit patterns other than all zeros or all ones (e.g., 1010 . . . or the like) can be employed.

While in the above embodiment data having a transmission data length, which is a portion of the initial data of the data row of the feedback frame, is employed as discriminating data for discriminating whether there is transmission data or not, data exclusively used for discrimination may be provided at the initial portion or a portion near the initial portion of the feedback pattern.

Next, another embodiment of the present invention will be described. An ARQ data frame transmitted from the transmission side to the reception side and the ARQ feedback frame transmitted from the reception side to the transmission side have an identical format. As has been described with reference to FIG. 1, the format includes a transmission data frame length A of 16 bits, for example, transmission data B of 584 bits, for example, a transmission data frame number C of 8 bits, for example, and a repeat request frame number (this data can be omitted) D of 8 bits, for example, and the format is further added with an error detecting code E of 16 bits, for example, serving all the data.

The transmission data length A can take values of the data amount of the transmission data B, e.g., values from 0 to 584 in a bit unit, for example. In this case, the data amount thereof is 584 bits. The transmission frame number C indicates a frame number that should be transmitted (e.g., from 0 or 1 to 255). The repeat request frame number D is utilized in a feedback frame to be transmitted from the reception side to the transmission side, and it indicates a frame number that is expected to be received on the reception side (the oldest frame number that has not been received yet).

As described above, the error detecting code E employs the ITU—T (16 bits) of the CRC code, for example. A region in which the CRC is applied is a region of 624 bits from the transmission data length A to the repeat request frame number D.

Next, a feedback frame transmitted from the reception side to the transmission side or a data frame transmitted from the transmission side to the reception side will be described with reference to FIG. 11. In this case, if a data length $LB_x$ (although it is an arbitrary data length, for example, 10 byte=80 bits, a length longer or shorter than that length can be naturally employed) of the feedback frame of transmission data $B_x$ to be transported on the data frame is shorter than a predetermined data length $LB_0$ (e.g., 584 bits) which is predetermined in the ARQ data frame, then transmission data $B_x$ is allocated to a portion (D33 to D112) having an arbitrary data length $LB_x$ within a region of transmission data B (D33 to D624) (see FIG. 11) having a data length $LB_0$ while a fixed pattern (e.g., all zeros or all ones or other various patterns other than all zeros and all ones can be employed) is allocated to the remaining data length ($LB_0$–$LB_x$) {584–80=504 (bits)} (see FIG. 11) other than the effective data. The number 80, which is the data length $LB_x$ (80 bits) of the transmission data $B_x$, is converted into a binary digit and allocated to the transmission data length A of the ARQ data frame. By the way, the transmission frame number C and the repeat request frame number D are arranged in a similar manner to what was described with reference to FIG. 1. Then, the error detecting code E is added for data A, B, C and D.

Such a feedback frame or the data frame is transmitted from the reception side to the transmission side or from the transmission side to the reception side. The received feedback frame or the data frame is subjected to detection for detecting data length $LB_x$ (80 bits) indicated by the data length A on the transmission side or the reception side. Depending on the data length $LB_x$ thereof, data on the fixed pattern region (D113 to D624) of a data length ($LB_0$–$LB_x$) {584–80=504 (bits)} within the region of the transmission data B, on which data other than the effective data $B_x$ with the data length of $LB_x$ is provided, is substituted with the above-described fixed pattern (all zeros). Thereafter, the feedback frame or the data frame, a part of which is substituted with a fixed pattern, is supplied to the error detecting circuit to detect whether there is an error or not.

Next, a description will be given of the error detecting apparatus for detecting an error in the feedback frame or the data frame which is received on the transmission side or the reception side with reference to FIG. 12. By the way, parts in FIG. 12 corresponding to those in FIG. 7 are attached with the same reference numerals and overlapping explanation thereof will be omitted. Reference numeral 3 represents the error detecting circuit, 8 the zero generator, 7 the changeover switch for switching between the input terminal 6 and the zero generator 8 so that the error detecting circuit 3 is supplied with data rows from the input terminal 6 or data rows of all zeros from the zero generator 8, and a data length detecting circuit 1. The changeover switch 7 is controlled by a control signal supplied from the data length detecting circuit 1 to the control terminal 2.

The data row (bit strings) constituting the feedback frame or the data frame is supplied to the input terminal 6, thereby being arrayed consecutively from D640 (MSB) to D1 (LSB). The data row is supplied to the FF circuit R0, or a first stage of the shift register which is formed of 16 D-type flip-flop circuits (hereinafter simply referred to as FF circuits) R0, R1, . . . , R14, R15 connected in a cascade fashion. The data is shifted in the left-hand direction in the figure. When respective data D640 to D625 of 16 bits of the transmission data length A is stored in the FF circuits R15 to R0, the respective data D640 to D625 is supplied to the data length detecting circuit 1 to detect the data length $LB_x$.

The changeover switch 7 is controlled by the data length detecting circuit 1 based on the detecting data length $LB_x$.

During a period in which the supplied data is the data row (invalid data row) D624 to D113 of the data length ($LB_0$–$LB_x$) of the transmission data B of the received feedback frame or the data frame, the changeover switch 7 is turned to the zero detector 8 side, whereby the zero data row from the zero detector 8 is supplied to the error detecting circuit 3. During a period other than the above, the changeover switch 7 is turned to the input terminal 6 side, whereby the data row D640 to D625 and D112 to D1 are directly supplied to the error detecting circuit 3.

Specifically, the data row (invalid data row) D624 to D113 of the data length ($LB_0$–$LB_x$) within the transmission data B of the received feedback frame or data frame is substituted with all zeros.

Figure 12:
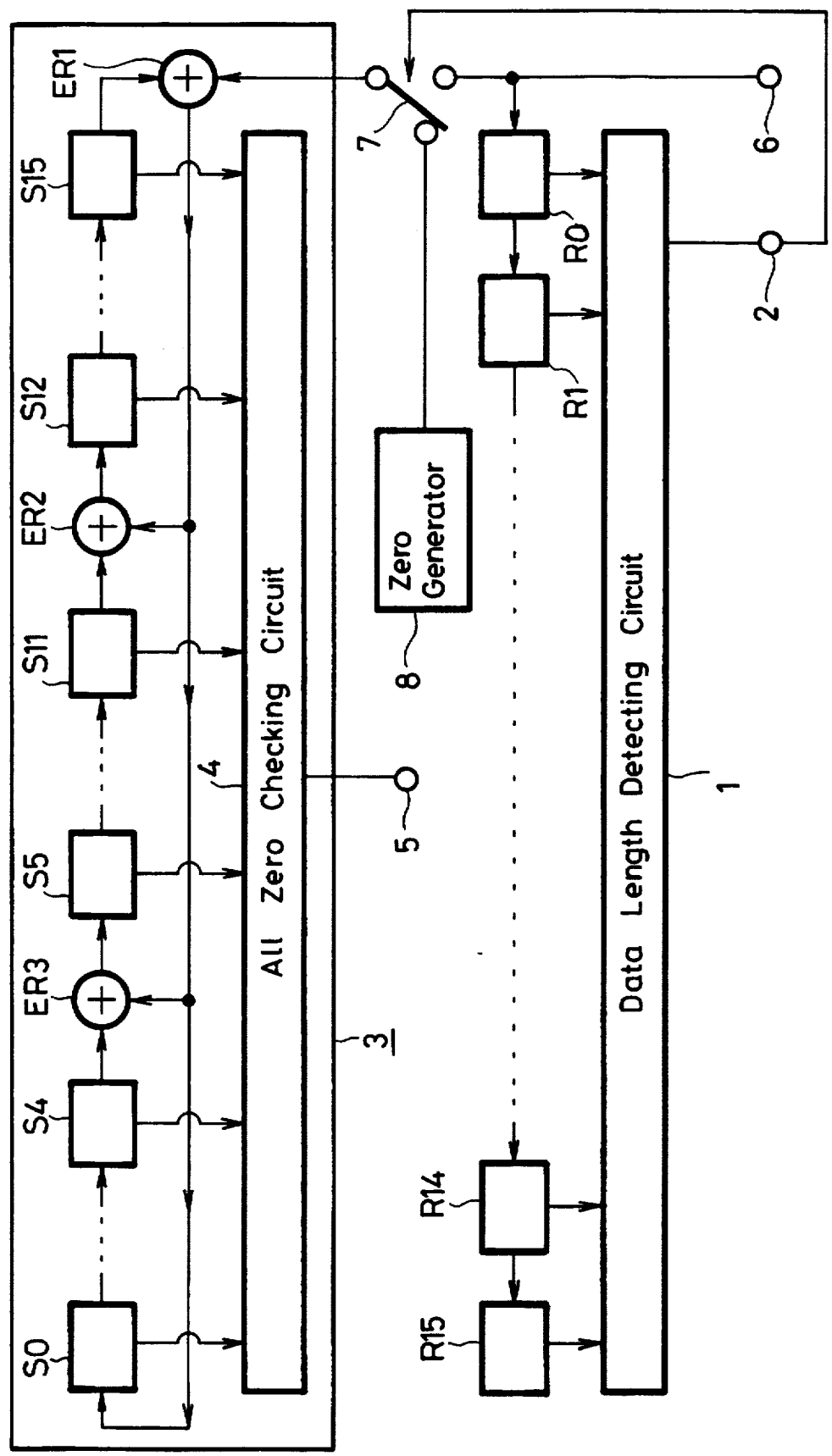
FIG. 12 is a schematic block diagram showing an error detecting apparatus for detecting an error in the feedback frame or the data frame according to the present invention.

The arrangement and operation of the error detecting circuit 3 of the error detecting apparatus of FIG. 12 is similar to that of the error detecting apparatus of FIG. 7. Therefore, it will not be described.

The effective feedback frame or the effective data frame in the embodiment becomes a frame of 136 bits which is obtained by subtracting the data length ($LB_0$–$LB_x$) (e.g., 504 bits) within the transmission data B from the bit length of 640 bits of the received feedback frame or data frame. Thus, the bit number is remarkably reduced as compared with the bit number (640 bits) of the feedback frame or the data frame in the prior art example shown in FIG. 8B, and hence the reception rate of the feedback frame or the data frame is remarkably increased. Therefore, reduction in the total throughput of ARQ due to an error of the feedback frame or the data frame can be relieved.

According to the present invention, in data communication in which a data frame transmitted from the transmission side to the reception side and a feedback frame transmitted from the reception side to the transmission side are arranged to have an identical format, and this format includes at least transmission data length, transmission data, a data frame number and a repeat request frame number, and is added with an error detection code for all the data, if there is no substantial transmission data to be transported by the feedback frame on the reception side, then the data of the feedback frame which does not have to be fedback including at least the transmission data length, the transmission data and the data frame number within the feedback frame, is substituted with a predetermined fixed pattern. Thereafter, an error detecting code for all the data is added thereto. Then, the feedback frame arranged as described above is transmitted from the reception side to the transmission side. Therefore, if there is no substantial data to be transported by the feedback frame on the reception side, the feedback frame can be transmitted from the reception side to the transmission side without changing the format of the feedback frame and lowering the reception rate.

According to the present invention, if it is detected on the transmission side that the received feedback frame contains no substantial transmission data, then at least a part of the data in a region of the received feedback frame in which substitution has been made with the fixed pattern, is again substituted with the predetermined fixed pattern, and thereafter error detection is carried out. Therefore, the transmitter can process the received feedback frame without lowering the reception rate.

According to the present invention, the fixed pattern is a pattern of all zeros or all ones. Therefore, data which does not have to be fedback can be substituted with ease on the reception side and the transmission side, and the generator of the fixed pattern can be simply arranged.

According to the present invention, in data communication in which the data frame transmitted from the transmission side to the reception side and the feedback frame transmitted from the reception side to the transmission side are arranged to have an identical format, and this format includes at least transmission data length, transmission data and the data frame number, and is added with an error detection code for all the data, the transmission data of a predetermined data length within the feedback frame is arranged so as to be composed of effective data formed of transmission data of an arbitrary data length shorter than the predetermined data length and a fixed pattern having a data length which is produced by subtracting the arbitrary data length from the predetermined data length. The transmission data length is set to the arbitrary data length, and thereafter an error detecting code for all the data is added therewith. Then, the feedback frame arranged as described above is transmitted from the reception side to the transmission side. Therefore, if the data length of the transmission data to be transported by the feedback frame on the reception side is shorter than the predetermined data length which derives from the format of the frame, then the feedback frame can be transmitted from the reception side to the transmission side without changing the format of the feedback frame and lowering the reception rate.

According to the present invention, when the transmitter receives the feedback frame which has been arranged as described above, the data in the fixed pattern region having a data length, which is produced by subtracting the arbitrary data length detected in accordance with the transmission data length from the predetermined data length of the transmission data, within the received feedback frame is substituted with the predetermined fixed pattern, and thereafter error correction is made. Therefore, the feedback frame received by the transmitter can be processed on the transmission side without lowering the reception rate.

Having described the preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A communication system for communicating between a transmitter and a receiver, wherein when said transmitter transmits a data frame, a receiver feeds back a feedback frame to said transmitter, and wherein said data frame transmitted from said transmitter and said feedback frame fed back to said transmitter from said receiver have an identical format, said communication system comprising means for substituting a redundant portion of said feedback frame fed back from said receiver that is redundant to said data frame transmitted by said transmitter with a predetermined bit stream.

2. The communication system as set forth in claim 1, wherein said predetermined bit stream consists of all zeros.

3. The communication system as set forth in claim 1, wherein said predetermined bit stream consists of all ones.

4. The communication system as set forth in claim 1, wherein said identical format includes a transmission data length, transmission data, a transmission data frame number, a frame number to be retransmitted, and an error detecting code, and wherein said redundant portion of said feedback frame includes said transmission data length, said transmission data, and said transmission data frame number.

5. A communication method for performing data communication between a transmitter and a receiver, wherein a data frame transmitted by said transmitter and a feedback frame fed back from said receiver to said transmitter have an identical format, and wherein said communication method is utilized by said receiver, said method comprising the step of substituting a redundant portion of said feedback frame fed back from said receiver and containing no substantial information about a received data frame received by said receiver and redundant to said data frame transmitted by said transmitter with a predetermined bit stream upon forming said feedback frame in said receiver.

6. The communication method as set forth in claim 5, wherein said predetermined bit stream consists of all zeros.

7. The communication method as set forth in claim 5, wherein said predetermined bit stream consists of all ones.

8. The communication method as set forth in claim 5, wherein said identical format includes a transmission data length, transmission data, a transmission data frame number, a frame number to be retransmitted and an error detecting code, and wherein said redundant portion of said feedback frame includes said transmission data length, said transmission data and said transmission data frame number.

9. A communication method for performing data communication between a transmitter and a receiver, wherein a data frame transmitted by said transmitter and a feedback frame fedback from said receiver to said transmitter have an identical format and wherein said communication method is utilized by said transmitter receiving said feedback frame from the receiver, comprising the steps of:

determining whether a first portion of the feedback frame transmitted by said receiver that is redundant to said data frame consists of a first predetermined bit stream; and substituting a second portion of said feedback frame transmitted by said receiver that is redundant to said data frame with a second predetermined bit stream upon determining that said first portion of the feedback frame that is redundant to said data frame consists of the first predetermined bit stream.

10. The communication method as set forth in claim 9, wherein a length of said first predetermined bit stream is fixed.

11. The communication method as set forth in claim 9, wherein a length of said first predetermined bit stream is varied.

12. The communication method as set forth in claim 9, wherein said first predetermined bit stream consists of all zeros.

13. The communication method as set forth in claim 9, wherein said first predetermined bit stream consists of all ones.

14. The communication method as set forth in claim 9, wherein said second predetermined bit stream consists of all zeros.

15. The communication method as set forth in claim 9, wherein said second predetermined bit stream consists of all ones.

16. The communication method as set forth in claim 9, wherein said identical format includes a transmission data length, transmission data, a transmission data frame number, a frame number to be retransmitted, and an error detecting code, and wherein one of said first or second portion of said feedback frame which are redundant to said data frame at least include a part of said transmission data length, said transmission data and said transmission data frame number.

17. The communication method as set forth in claim 16, further comprising the step of detecting an error located anywhere in the feedback frame after said second portion of said feedback frame that is redundant to said data frame is substituted with said second predetermined bit stream.

18. A feedback frame receiving apparatus for receiving a feedback frame transmitted by a receiver in response to a data frame transmitted by a transmitter, wherein said data frame transmitted by said transmitter and said feedback frame transmitted by said receiver have an identical format, said apparatus comprising:

feedback frame input terminal means for supplying said feedback frame transmitted by said receiver;

determining means for determining whether a first portion of said feedback frame that is redundant to said data frame consists of a first predetermined bit stream;

second predetermined bit stream generating means for generating a second predetermined bit stream;

substituting means for substituting a second portion of said feedback frame with said second predetermined bit stream upon determining that said first portion of said feedback frame consists of said first predetermined bit stream; and error detecting means for detecting an error in said feedback frame processed by said substituting means.

19. The feedback frame receiving apparatus as set forth in claim 18, wherein a length of said first predetermined bit stream is fixed.

20. The feedback frame receiving apparatus as set forth in claim 18, wherein a length of said first predetermined bit stream is varied.

21. The feedback frame receiving apparatus as set forth in claim 18, wherein said first predetermined bit stream consists of all zeros.

22. The feedback frame receiving apparatus as set forth in claim 18, wherein said first predetermined bit stream consists of all ones.

23. The feedback frame receiving apparatus as set forth in claim 18, wherein said second predetermined bit stream consists of all zeros.

24. The feedback frame receiving apparatus as set forth in claim 18, wherein said second predetermined bit stream consists of all ones.

25. The feedback frame receiving apparatus as set forth in claim 18, wherein said identical format includes a transmission data length, transmission data, a transmission data frame number, a frame number to be retransmitted and an error detecting code, and wherein one of said first or said second portion of the feedback frame at least include a part of said transmission data length, said transmission data and said transmission data frame number.

26. A radio communication terminal apparatus for performing data communication, wherein a data frame transmitted by a transmitter and a feedback frame transmitted by a receiver to said transmitter have an identical format, said apparatus comprising:

an antenna for transmitting and for receiving a first signal and a second signal, respectively;

received signal processing means for processing said second signal received by said antenna;

transmitting signal processing means for processing said first signal to be transmitted by said antenna; and baseband signal processing means for processing a baseband signal received by said antenna, wherein said baseband signal processing means includes feedback frame input terminal means for inputting said feedback frame transmitted by said receiver, determining means for determining whether a first portion of said feedback frame that is redundant to said data frame consists of a first predetermined bit stream, second predetermined bit stream generating means for generating a second predetermined bit stream, substituting means for substituting a second portion of said feedback frame that is redundant to said data frame with said second predetermined bit stream upon determining that said first portion of said feedback frame consists of said first predetermined bit stream, and error detecting means for detecting an error in said feedback frame processed by said substituting means.

* * * * *